United States Patent
Hermann

Patent Number: 6,114,777
Date of Patent: Sep. 5, 2000

[54] CIRCUIT CONFIGURATION FOR CURRENT LIMITING IN A PROTECTION SYSTEM, IN PARTICULAR AIRBAG CONTROL SYSTEM

[75] Inventor: Stefan Hermann, Köfering, Germany

[73] Assignee: Siemens Aktiengesellschaft, Munich, Germany

[21] Appl. No.: 09/273,251

[22] Filed: Mar. 19, 1999

Related U.S. Application Data

[63] Continuation of application No. PCT/DE97/02091, Sep. 17, 1997, abandoned.

[30] Foreign Application Priority Data

Sep. 19, 1996 [DE] Germany .......................... 196 38 457

[51] Int. Cl.⁷ ....................................................... B60L 1/00
[52] U.S. Cl. .......................... 307/10.1; 307/9.1; 180/271; 280/728.1; 323/284; 701/45
[58] Field of Search .................................. 307/10.1, 10.7, 307/9.1; 323/284; 180/271; 280/728.1, 735, 734; 340/436; 701/45

[56] References Cited

U.S. PATENT DOCUMENTS

| | | | |
|---|---|---|---|
| 4,253,055 | 2/1981 | Gatten | 323/284 |
| 5,155,376 | 10/1992 | Okano | 307/10.1 |
| 5,666,065 | 9/1997 | Ravas et al. | 324/769 |
| 5,670,829 | 9/1997 | Sussak | 307/10.1 |
| 5,701,038 | 12/1997 | Kincaid | 280/728.1 |
| 5,734,317 | 3/1998 | Bennett et al. | 280/738 |

FOREIGN PATENT DOCUMENTS

| | | |
|---|---|---|
| 0 284 728 A1 | 10/1988 | European Pat. Off. . |
| 0 590 666 A2 | 4/1994 | European Pat. Off. . |
| 0 679 554 A2 | 11/1995 | European Pat. Off. . |

OTHER PUBLICATIONS

International Publication No. WO 90/02674 (Schumacher et al.), dated Mar. 22, 1990.

*Primary Examiner*—Albert W. Paladini
*Attorney, Agent, or Firm*—Herbert L. Lerner; Laurence A. Greenberg; Werner H. Stemer

[57] ABSTRACT

A circuit for current limiting in a protection system, in particular for the firing of the firing pellet of an airbag system. The circuit has a switched-mode regulator connected to a low-pass filter that cooperate to limit the average and the peak value of the current flowing through the firing pellet. The switched mode regulator has switches that are switched on when the current flowing through the firing pellet falls below a reference value.

7 Claims, 1 Drawing Sheet

CIRCUIT CONFIGURATION FOR CURRENT LIMITING IN A PROTECTION SYSTEM, IN PARTICULAR AIRBAG CONTROL SYSTEM

CROSS-REFERENCE TO RELATED APPLICATION

This is a continuation of International Application CT/DE97/02091, filed Sep. 17, 1997, which designated the United States, and which was abandoned in favor of this application.

BACKGROUND OF THE INVENTION

1. Field of the Invention

The invention relates to the field of systems that protect living beings from physical harm. More specifically, the invention relates to a circuit for triggering a protection system, in particular, for firing the firing pellet of an airbag system.

Motor vehicle airbag systems usually have firing pellets triggered by electrical current flow. In many instances, a firing capacitor serves as an energy source. Because of the limited energy content of the capacitor, it is necessary to limit the firing current for the triggering situation. European Patent Application EP-A-0 284 728 discloses a system provided with a plurality of airbags using a capacitance situated in the relevant series path to limit the quantity of charge flowing through the series path. If the relevant capacitance is charged, the current flow is interrupted so that the firing pellet of the series path can be fired.

International Patent Application WO 90/02674 discloses an airbag system that limits a current flowing through circuit-breakers in series with a triggering device. Current limiting is achieved by detecting a voltage drop across resistors connected downstream and comparing the voltage drop with reference voltages using a comparator. The comparator provides the circuit-breakers with a signal that is used to limit the level of current flow. This enables the use of one firing capacitor in a known airbag system.

A further measure for current limiting in a circuit for firing an airbag firing pellet is to provide current-limiting switches at the input and at the output of the firing pellet. A high loss of energy is associated with the voltage drop across the switches. Because of this loss of energy, the firing capacitor must be dimensioned to be relatively large, which causes a deterioration of its intended function.

2. Summary of the Invention

It is accordingly an object of the present invention to provide firing current limiting in a protection system circuit, in particular for firing a firing pellet of an airbag system, which is energy-saving and cost-effective.

With the foregoing and other objects in view there is provided, in accordance with the invention, a circuit for firing a firing pellet, comprising:

a switched-mode regulator; and a low-pass filter connected to the switched-mode regulator;

the switched mode regulator cooperating with the low pass filter to limit an average and a peak value of a current flowing through a firing pellet.

In accordance with an added feature of the invention, the low-pass filter includes an inductor and a capacitor connected to the inductor.

In accordance with an additional feature of the invention, the switched-mode regulator includes a switch that is switched on when the current flowing through the firing pellet falls below a reference value.

In accordance with another feature of the invention, the low-pass filter has two input terminals;

the switched-mode regulator includes a first switch that is switched on when the current flowing through the firing pellet falls below a reference value, the first switch being connected to one of the input terminals of the low-pass filter; and the switched-mode regulator includes a second switch that is switched on when the current flowing through the firing pellet falls below the reference value, the second switch being connected to the other one of the input terminals of the low-pass filter.

In accordance with a further feature of the invention, the low-pass filter has two input terminals; and the switched-mode regulator includes:

a current sensor having an output providing an indication of the current flowing through the firing pellet;

a comparator having a first input connected to the output of the current sensor, a second input connected to a reference value, and an output;

a first switch connected to one of the input terminals of the low-pass filter, the first switch having a control input; and a second switch connected to the other one of the input terminals of the low-pass filter, the second switch having a control input;

the output of the comparator connected to the control inputs causing the first and second switches to switch on when the current flowing through the firing pellet falls below the reference value.

In accordance with again an added feature of the invention, the switched-mode regulator includes a comparator with hysteresis.

In accordance with a concomitant feature of the invention, the low-pass filter has two input terminals; and the switched-mode regulator includes:

a current sensor having an output providing an indication of the current flowing through the firing pellet;

a comparator having a first input connected to the output of the current sensor, a second input connected to a reference value, and an output;

a first switch connected to one of the input terminals of the low-pass filter, the first switch having a control input;

a second switch connected to the other one of the input terminals of the low-pass filter, the second switch having a control input; and an AND gate having two inputs and an output, one of the inputs connected to a trigger signal;

the output of the comparator being connected to the other of the inputs of the AND gate, the output of the AND gate connected to the control inputs causing the first and second switches to switch on when the trigger signal is active and when the current flowing through the firing pellet falls below the reference value.

The invention has the advantage that the average value of the current, including rise and fall times of the current flowing through the firing pellet, is limited by simple circuit elements, namely by a switched-mode regulator in combination with a low-pass filter. This results in a very small voltage drop, and thus a reduced power loss, across the switches provided in the circuit. This provides increased service life of the switches and enables the firing capacitor to have smaller dimensions.

Other features which are considered as characteristic for the invention are set forth in the appended claims.

Although the invention is illustrated and described herein as embodied in a circuit for current limiting in a protection system, in particular an airbag control system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
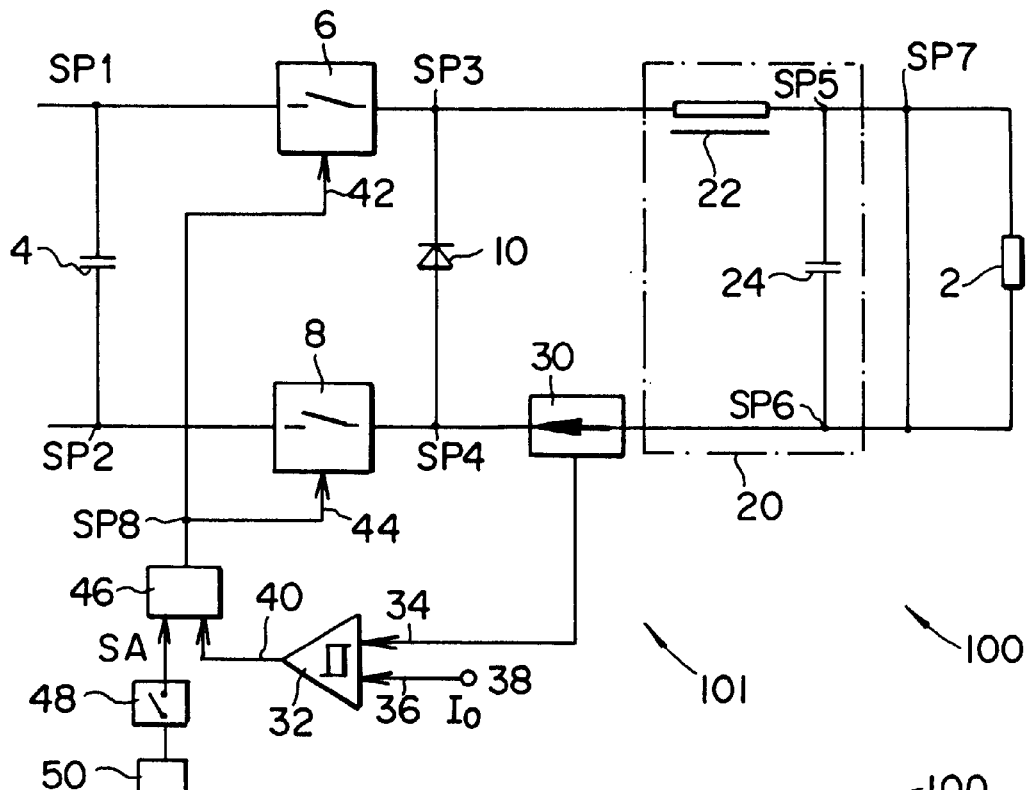
FIG. 1 is a schematic circuit diagram of the circuit according to the invention.
Figure 2:
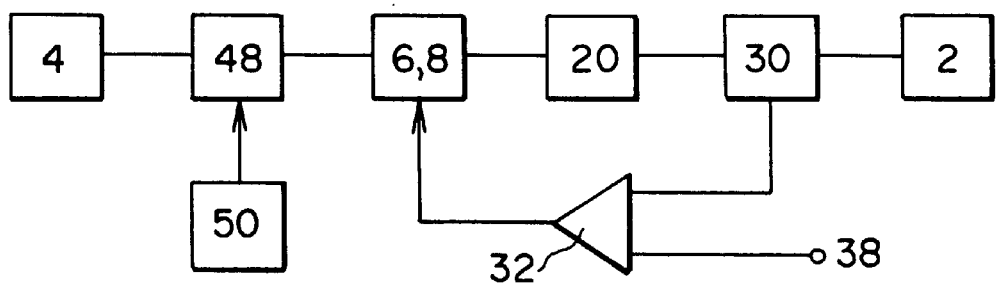
FIG. 2 is a schematic block diagram of the circuit.

The circuit 100 shown as a schematic circuit diagram in FIG. 1 and as a block diagram in FIG. 2 is used to trigger a motor vehicle airbag system. A firing capacitor 4 serves as an energy source for firing a firing pellet 2. One terminal of a high side switch 6 is connected to one terminal of the firing capacitor 4 at node SP1. One terminal of a low side switch 8 is connected to the other terminal of the firing capacitor 4 at node SP2. A rectifier diode 10 is connected between the other terminals of the switches 6, 8 at nodes SP3 and SP4, respectively.

A low-pass filter 20 is connected between the rectifier diode 10 and the firing pellet 2. The low-pass filter 20 includes an inductor 22, connected between nodes SP3 and SP5, and a capacitor 24, connected between nodes SP5 (also indicated as SP7) and SP6. The capacitor 24 is connected in parallel with the firing pellet 2.

A current sensor 30 is connected between the nodes SP6 and SP4 for sensing the current I flowing through the firing pellet 2. The output of the sensor 30 is connected to a first input 34 of a comparator 32 with hysteresis $+/-\Delta$. The second input 36 of the comparator 32 is connected to a reference current value $I_O$ that is provided by output means 38. The output 40 of the comparator 32 is connected to one input of an AND gate 46. The other input of the AND gate 46 is connected to a trigger switch 48 that is connected to an evaluation circuit 50 for the airbag. The output of the AND gate 46 is connected via the node SP8 to the respective control inputs 42, 44 of the two switches 6, 8. Consequently, the switches 6, 8 are actuated in a manner dependent on the ascertained value of the current I flowing through the firing pellet 2.

The circuit 100 described functions as follows. At the instant tA (shown in FIG. 3), the trigger signal SA is passed from the evaluation circuit 50 via the trigger switch 48 to the AND gate 46. The trigger signal SA enables a very large current with a maximum current intensity Imax to be provided to the firing pellet 2. When the output signal 40 of the comparator 32 and the trigger signal SA are present at the inputs of the AND gate 46, the switches 6, 8 are closed. Therefore, the current I is regulated to the reference value $I_0$ by operation of the switched-mode regulator 101 that includes switches 6 and 8, current sensor 30, comparator 32, and AND gate 46.

Figure 3:
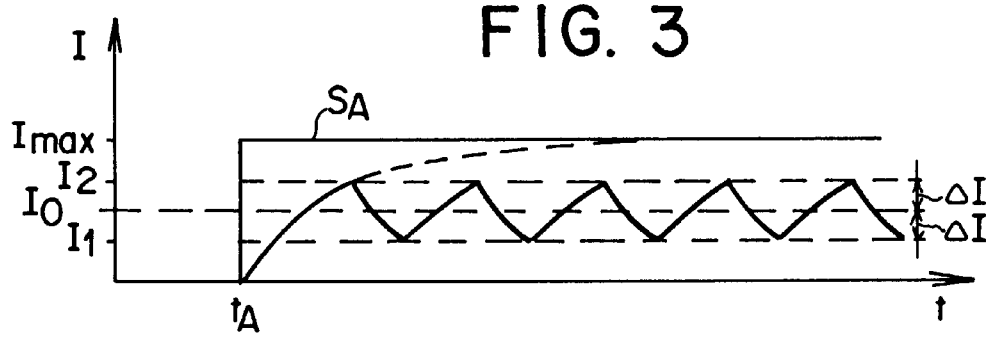
FIG. 3 is a diagram illustrating the current profile.

The timing diagram shown in FIG. 3 illustrates limiting the current I flowing through the firing pellet 2 to a current having an average value $I_0$ between $I_1$ and $I_2$. The timing diagram also illustrates the rise and fall times of the current I. If the current I were not limited by the switched-mode regulator 101, the current I would assume the dashed profile shown in FIG. 3. The energy stored in the inductor 22 and the capacitor 24 of the low-pass filter 20 is conducted via the diode 10 into the firing pellet 2. The current I flowing through the firing pellet 2 is thereby smoothed. If the current I exceeds the limit value $I_0+\Delta$, the switches 6, 8 are switched off and the current falls. If the current I falls below the limit value $I_0-\Delta$, the switches 6, 8 are switched on again. This is repeated until the current I through the firing pellet 2 no longer exceeds the limit value $I_0+\Delta$. The period of this procedure is determined by the cut-off frequency of the low pass filter 20 and by the hysteresis of the comparator 32. If the limit value $+\Delta$ is then no longer exceeded, the switches 6, 8 remain closed.

The voltage drops across the switches 6 and 8 are small and, consequently, the power loss is small.

I claim:

1. A circuit for firing a firing pellet, comprising:

a switched-mode regulator configured to provide a current;

a low-pass filter connected to said switched-mode regulators said low-pass filter receiving and smoothing the current from said switched-mode regulator to provide a current that fluctuates between a lower limit value and an upper limit value; and a firing pellet receiving the current provided by said low-pass filter to fire said firing pellet.

2. The circuit according to claim 1, comprising a capacitor for supplying power to said switched-mode regulator.

3. The circuit according to claim 1, wherein said switched-mode regulator includes a switch that is switched on when the current flowing through the firing pellet falls below a reference value.

4. The circuit according to claim 1, wherein:

said low-pass filter has two input terminals;

said switched-mode regulator includes a first switch that is switched on when the current flowing through the firing pellet falls below a reference value, said first switch connected to one of said input terminals of said low-pass filter; and said switched-mode regulator includes a second switch that is switched on when the current flowing through the firing pellet falls below the reference value, said second switch connected to the other one of said input terminals of said low-pass filter.

5. The circuit according to claim 1, wherein:

said low-pass filter has two input terminals; and said switched-mode regulator includes:

a current sensor having an output providing an indication of the current flowing through the firing pellet;

a comparator having a first input connected to said output of said current sensor, a second input connected to a reference value, and an output;

a first switch connected to one of said input terminals of said low-pass filter, said first switch having a control input; and a second switch connected to the other one of said input terminals of said low-pass filter, said second switch having a control input;

said output of said comparator connected to said control inputs causing said first and second switches to switch on when the current flowing through the firing pellet falls below the reference value.

6. The circuit according to claim 1, wherein said switched-mode regulator includes a comparator with hysteresis.

7. The circuit according to claim 1, wherein:

said low-pass filter has two input terminals; and said switched-mode regulator includes:
- a current sensor having an output providing an indication of the current flowing through the firing pellet;
- a comparator having a first input connected to said output of said current sensor, a second input connected to a reference value, and an output;
- a first switch connected to one of said input terminals of said low-pass filter, said first switch having a control input;
- a second switch connected to the other one of said input terminals of said low-pass filter, said second switch having a control input; and
- an AND gate having two inputs and an output, one of said inputs connected to a trigger signal;

said output of said comparator connected to the other of said inputs of said AND gate, said output of said AND gate connected to said control inputs causing said first and second switches to switch on when the trigger signal is active and when the current flowing through the firing pellet falls below the reference value.

* * * * *